United States Patent [19]

Petersen et al.

[11] 4,243,797
[45] Jan. 6, 1981

[54] PROCESS FOR THE MANUFACTURE OF SOFT AND HARD RESINS OF UREA, FORMALDEHYDE AND A CH-ACIDIC ALDEHYDE, AND THEIR USE

[75] Inventors: Harro Petersen, Frankenthal; Kurt Fischer, Ludwigshafen; Hans Klug, Mutterstadt; Werner Trimborn, Limburgerhof; Horst Schmidt, Mannheim, all of Fed. Rep. of Germany

[73] Assignee: BASF Aktiengesellschaft, Fed. Rep. of Germany

[21] Appl. No.: 971,187

[22] Filed: Dec. 20, 1978

[30] Foreign Application Priority Data

Dec. 22, 1977 [DE] Fed. Rep. of Germany ....... 2757220

[51] Int. Cl.$^3$ ............................................. C08G 12/12
[52] U.S. Cl. .................................. 528/239; 528/232; 528/242; 528/259; 528/488
[58] Field of Search ............... 528/259, 239, 231, 232, 528/270, 488; 260/29.4 R, 15; 525/154

[56] References Cited

U.S. PATENT DOCUMENTS

| | | | |
|---|---|---|---|
| 3,265,645 | 8/1966 | Coney et al. | 260/15 |
| 4,102,840 | 7/1978 | Pusch | 528/259 |

FOREIGN PATENT DOCUMENTS 1191710 5/1970 United Kingdom .

*Primary Examiner*—Theodore E. Pertilla
*Attorney, Agent, or Firm*—Keil & Witherspoon

[57] ABSTRACT

A process for the preparation of soft and hard resins, and their use in surface-coating binders are disclosed. According to the invention, soft and hard resins are prepared from a urea, formaldehyde and a CH-acidic aldehyde by reacting a urea of the general formula (I) or (II)

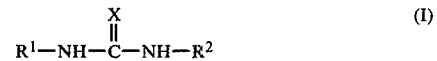

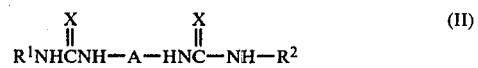

where $R^1$ and $R^2$ are hydrogen or identical or different alkyl, A is alkylene and X is oxygen or sulfur, with formaldehyde and a CH-acidic aldehyde of the general formula (III)

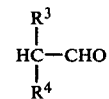

where $R^3$ and $R^4$ are identical or different alkyl, aryl or alkylaryl wherein the urea, formaldehyde and CH-acidic aldehyde are employed in a mole ratio of from 1:2:2 to 1:4:4, at from 60° to 150° C., in the presence of an acid and in the presence or absence of a solvent and/or diluent, and then treating the product with a base in an anhydrous medium.

7 Claims, No Drawings

PROCESS FOR THE MANUFACTURE OF SOFT AND HARD RESINS OF UREA, FORMALDEHYDE AND A CH-ACIDIC ALDEHYDE, AND THEIR USE

FIELD OF THE INVENTION

The present invention relates to a process for the preparation of soft and hard resins from a urea, formaldehyde and a CH-acidic aldehyde, and to their use.

BACKGROUND OF THE INVENTION

Condensation products of urea or its derivatives with formaldehyde and CH-acidic aldehydes have been disclosed in the patent literature. For example, according to German Pat. No. 1,272,284, the contents of which correspond to British Pat. No. 1,191,710, the reaction of the components in the stoichiometric ratio gives the ureido-propionaldehydes of the general formula

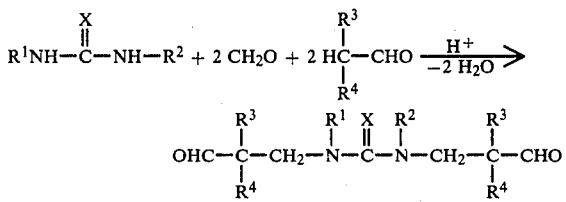

However, the products obtained cannot be used for certain applications, for example for the surface-coating industry. On storage, and especially on exposure to light, particularly on exposure to UV radiation, the products eliminate carbon monoxide and this causes the resins to froth.

It is an object of the present invention to provide a process which gives condensation products of a urea, formaldehyde and a CH-acidic aldehyde, which do not suffer from the above disadvantages.

We have found, surprisingly, that a further reaction of the condensation products of a urea, formaldehyde and a CH-acidic aldehyde with an alcoholate, preferably in the presence of an aromatic hydrocarbon, results in conversion to a resinous product which does not eliminate carbon monoxide.

Accordingly, the present invention relates to a process for the preparation of soft and hard resins from a urea formaldehyde and a CH-acidic aldehyde, by reacting a urea of the general formula (I) or (II)

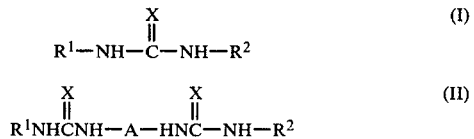

where $R^1$ and $R^2$ are hydrogen or identical or different alkyl, A is alkylene and X is oxygen or sulfur, with formaldehyde and a CH-acidic aldehyde of the general formula

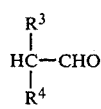

where $R^3$ and $R^4$ are identical or different alkyl, aryl or alkylaryl, at from 60° to 150° C., in the presence of an acid and in the presence or absence of a solvent and/or diluent, wherein the product is then treated with a base in an anhydrous medium.

In a preferred embodiment of the process according to the invention, the base used for the after-treatment is an alkali metal alcoholate in an anhydrous medium and the reaction is carried out in the presence of an aromatic hydrocarbon.

The present invention further relates to the use of the soft and hard resins prepared according to the invention, in combination with other film-forming agents, as surface-coating binders.

The soft and hard resins prepared by the process according to the invention do not eliminate carbon monoxide on storage and on exposure to light.

Depending on the selected molar ratios and on the aldehyde used, resins having softening points of from about 60° to about 130° C. are obtained.

No aldehyde groups, and also no carboxylic acid ester groups, alcohol groups or carboxylic acid groups, can be detected in the condensation products which have been after-treated with alcoholates. The products obtained have the character of a hard resin and are soluble in alcohol and in some cases even in white spirit.

The following details may be noted in respect of the components from which the resins obtained according to the invention are synthesized.

Suitable ureas are those of the general formulae (I) and (II)

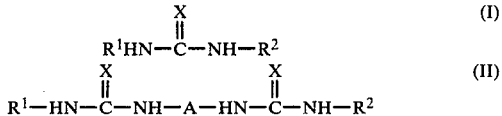

where $R^1$ and $R^2$ are hydrogen or identical or different alkyl, especially of 1 to 18, preferably of 1 to 5, carbon atoms, A is alkylene of 1 to 6, preferably of 1 to 3, carbon atoms and X is oxygen or sulfur.

In addition to urea or thiourea, monosubstituted and disubstituted ureas, and alkylenediureas, can also be employed. Preferably, however, urea is used to prepare the resins according to the invention.

The formaldehyde can be employed as an aqueous solution, for example of 40% strength, as paraformaldehyde, or as trixoane, tetroxane or a formaldehyde-acetal.

Since the condensation takes place via hydroxymethylureas, the urea and formaldehyde can be replaced by the corresponding hydroxymethylurea.

Suitable CH-acidic aldehydes of the general formula (III)

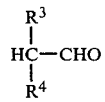

where $R^3$ and $R^4$ are identical or different alkyl, aryl or alkylaryl are those with alkyl of 1 to 8, preferably of 1 to 6, carbon atoms, and those with aryl of 6 to 10 carbon atoms or alkylaryl of 7 to 10 carbon atoms.

For the purposes of the invention, CH-acidic aldehydes are aldehydes which carry a hydrogen on the carbon adjacent to the carbonyl group.

Amongst these CH-acidic aldehydes, isobutyraldehyde, a cheap compound, and 2-ethylhexanal deserve special mention. Further examples of CH-acidic aldehydes are 2-methylpentanal, 2-phenylpropanal and isovaleraldehyde.

In the process according to the invention, the urea, formaldehyde and CH-acidic aldehyde are in general employed in a molar ratio of from 1:2:2 to 1:4:4, the latter being preferred. The properties of the resins according to the invention, especially their softening points and compatibility with solvents, can be deliberately varied by varying the molar ratios. For example a molar ratio of 1:2:2 gives hard resins whilst a molar ratio of 1:4:4 gives products having the character of a soft resin.

Suitable acids are inorganic and organic acids, preferably sulfuric acid and oxalic acid.

Solvents and/or diluents may be used when carrying out the process according to the invention. Aromatic hydrocarbons, especially xylene, have proved to be particularly suitable solvents.

The acid condensation is carried out at from 60° to 150° C., preferably from 80° to 100° C., advantageously until complete conversion of the components is reached.

After completion of the acid condensation, the mixture is neutralized in the conventional manner with a base, eg. NaOH or KOH, and the water present is removed by distillation. Catalytic amounts, in general from about 2 to 5% by weight, based on solid resin, of a base, preferably an alkali metal alcoholate, are then added. Sodium methylate and sodium ethylate have proved particularly suitable for this purpose. The treatment with the base is preferably carried out at from 80° to 120° C. and requires from about 1 to 2 hours. The mixture is then neutralized with an inorganic or organic acid, eg. with sulfuric acid or phthalic acid, the salt is washed out with water and the resin, dissolved in the organic solvent phase, is freed from the solvent by distillation.

The preparation of the resins according to the invention may be carried out batchwise or continuously.

The soft and hard resins prepared according to the process of the invention may be used, in combination with other physically drying film-forming agents conventionally used as surface-coating binders, such as cellulose derivatives, eg. nitrocellulose, ethylcellulose, cellulose acetobutyrate, chlorinated rubber, copolymers based on vinyl esters, vinyl ethers, vinyl chloride, acrylic esters or vinyl-aromatics, eg. vinyl chloride/vinyl isobutyl ether copolymers, or chemically drying binders, eg. alkyd resins, drying oils and semi-drying oils, for the production of surface coatings. The content of resin, prepared according to the invention, in these surface coatings can be varied within wide limits but is in most cases not more than 50% by weight, preferably from 2 to 40% by weight, of the total binder.

The resins according to the invention can be processed using the solvent and diluents conventionally employed in surface coating, such as alcohols, ketones, ethers, esters, eg. butyl acetate, aliphatic and aromatic hydrocarbons, eg. toluene, xylene, hexane and white spirit, or mixtures of the above solvents, as well as pigments, dyes, plasticizers, flow control agents and other assistants.

The surface-coating binders of the invention may be employed for finishing substrates such as wood, chipboard, paper and metal, eg. sheet steel, using conventional methods of application, eg. brushing, spraying or casting.

The novel products have very advantageous processing characteristics. They give surface coatings having very good mechanical properties, good gloss, good light resistance and good water resistance. The surface-coating binders according to the invention may, for example, be used very advantageously in matt spray coatings, quick-drying primers, paper varnishes and anti-corrosion finishes.

In the Examples, parts and percentages are by weight.

EXAMPLE 1

Resin based on the reaction of urea with formaldehyde and isobutyraldehyde in the molar ratio of 1:4:4

750 parts of 40% strength solution of formaldehyde in water, 720 parts of isobutyraldehyde and 150 parts of urea are mixed in a flask equipped with a condenser, thermometer, stirrer and dropping funnel and 150 parts of 75% strength sulfuric acid are added in the course of 10 minutes. The mixture is heated to 80° C. and is condensed at this temperature for 3 hours. 800 parts of xylene are then added, the batch is stirred for 20 minutes at 75° C., and after switching off the stirrer the aqueous phase is separated off. Residual water is removed from the xylene phase by azeotropic distillation, 90 parts of 30% strength sodium methylate solution in methanol are added and the mixture is stirred under reflux for 1 hour. It is then cooled to 70° C., neutralized with 75% strength sulfuric acid and washed with twice 500 parts of water.

After removing the wash water, the solvent is distilled from the xylene phase at about 20 mm Hg until the temperature in the flask reaches 175° C. 865 parts of a pale yellow resin having a DIN 53,180 softening point of 80°–82° C. are obtained.

| | |
|---|---|
| Acid number DIN 53,402 | >10 |
| Color number, measured on a 50% strength solution in xylene (DIN 53,403) | >6 |
| Non-volatiles (2 hours at 125° C.): | <98% |

The resin gives a clear solution in conventional solvents, eg. ethyl alcohol, butanol, methyl ethyl ketone, ethyl acetate, butyl acetate, toluene and xylene, with which it can be diluted in all proportions. In gasoline hydrocarbons, it is soluble in the ratio of about 1:1.

The resin is satisfactorily compatible with the following film-forming agents: nitrocellulose, ethylcellulose, vinyl chloride copolymers and chlorinated rubber.

The resin has very good light resistance and is not discolored by acids.

EXAMPLE 2

Resin based on urea/formaldehyde/2-methylpentanal in the molar ratio of 1:4:4.

600 parts of a 40% strength solution of formaldehyde in water, 800 parts of 2-methylpentanal and 120 parts of urea are mixed in a stirred flask like that described in Example 1 and 150 parts of 75% strength sulfuric acid are added in the course of about 10 minutes. The mixture is heated to 90° C. and is stirred at this temperature for 3 hours. 800 parts of xylene are then added, the mixture is stirred for 20 minutes at 80° C., and after switching off the stirrer the aqueous phase is separated off. The organic phase is freed from the residual water by azeotropic distillation under reduced pressure, 90 parts of 30% strength sodium methylate solution in methanol are added and the mixture is stirred for 1 hour at the boil.

It is then cooled to 70° C., neutralized to pH 7 with 75% strength sulfuric acid and washed with twice 500 parts of water.

Xylene is distilled from the solution under reduced pressure until the temperature in the flask reaches 175° C. The residue obtained consists of 880 parts of a pale soft resin which dissolves readily in alcohol, ethyl acetate and white spirit.

EXAMPLE 3

Resin based on urea/formaldehyde/2-phenylpropanal in the molar ratio of 1:4:4.

600 parts of a 40% strength aqueous solution of formaldehyde, 1,072 parts of 2-phenylpropanal and 120 parts of urea are introduced into a stirred apparatus like that described in Example 1, 150 parts of 75% strength sulfuric acid are added and the mixture is heated to 95° C. After stirring for 3 hours at 95° C., 1,200 parts of xylene are added, the mixture is stirred for 20 minutes at 80° C. and after switching off the stirrer the aqueous phase is separated off. The xylene phase is freed from residual water by azeotropic distillation under reduced pressure, 90 parts of 30% strength sodium methylate solution in methanol are added and the mixture is stirred for 1 hour under reflux.

It is then cooled to 70° C., neutralized with about 18 parts of 75% strength sulfuric acid and washed with twice 500 parts of water.

The solvent is distilled from the xylene phase under reduced pressure until the temperature in the flask reaches 175° C.

The resinous residue (1,180 parts) is readily soluble in alcohol and ethyl acetate and has a KSN softening point of 64° C.

EXAMPLE 4

Resin based on urea/formaldehyde/2-methylpentanal in the molar ration of 1:2:2.

A mixture of 300 parts of a 40% strength aqueous solution of formaldehyde, 400 parts of 2-methylpentanal and 120 parts of urea is introduced into a stirred apparatus like that described in Example 1, 150 parts of 75% strength sulfuric acid are added and the mixture is stirred at 90° C. for 3 hours.

800 parts of xylene are then added, the mixture is stirred briefly at 80°-85° C., and after switching off the stirrer the aqueous phase is separated off. The organic phase is freed from residual water by azeotropic distillation, 60 parts of 30% strength sodium methylate solution in methanol are added and the mixture is stirred for 1 hour under reflux.

The reaction solution is then cooled to 70° C., neutralized to pH 7 with 75% strength sulfuric acid and washed with twice 500 parts of water. The xylene solution is evaporated in vacuo until the temperature in the flask reaches 175° C.

The resin which remains (420 parts) gives a clear solution in alcohol and white spirit and has a KSN softening point of 101° C.

EXAMPLE 5

Resin based on urea/formaldehyde/isobutyraldehyde in the molar ratio of 1:3:3.

562.5 parts of a 40% strength aqueous solution of formaldehyde, 540 parts of isobutyraldehyde and 150 parts of urea are mixed in a stirred apparatus like that described in Example 1, 150 parts of 75% strength sulfuric acid are added and the mixture is heated to 80° C. and condensed at this temperature for 3 hours. 800 parts of xylene are then added to the reaction mixture, the batch is stirred for about 20 minutes at 70°-80° C. and after switching off the stirrer the aqueous phase is separated off. After distilling off the residual water remaining in the xylene, 90 parts of 30% strength sodium methylate solution in methanol are added and the mixture is stirred for 1 hour at the boil (103°-105° C.). It is then cooled to 60° C., neutralized to pH 7 with 75% strength sulfuric acid and washed with 500 parts of water at 80° C. The solvent is distilled from the xylene phase under reduced pressure (25 mm Hg) until the temperature in the flask reaches 175° C.

650 parts of a pale yellow hard resin which gives a clear solution in alcohol and has a KSN softening point of 94° C. are obtained.

EXAMPLE 6

A laboratory cascade consisting of three 1 liter flasks, arranged in series and each equipped with a stirrer, thermometer and reflux condenser, is fed, by means of metering pumps, with 410 parts/hour of a mixture of urea and a 40% strength aqueous formaldehyde solution in the molar ratio of 1:4, 328 parts/hour of isobutyraldehyde and 60 parts/hour of 75% strength sulfuric acid. The temperature is kept at 75°-80° C. in the first flask and at 90° C. in the second and third flasks.

The residence time of the reaction mixture in the cascade is about 4 hours.

The reaction product obtained from the cascade in one hour is dissolved in 500 parts of xylene and after separating off the aqueous phase the residual water is removed by azeotropic distillation. 50 parts of a 30% strength sodium methylate solution are then added and the mixture is stirred for 1 hour at the boil. The solution is then cooled to about 70° C., neutralized to pH 7 with 75% strength sulfuric acid and washed with twice 500 parts of water at 80° C.

The xylene solution is evaporated under reduced pressure until the temperature in the flask reaches 175° C.

The residue obtained consists of 400 parts of a pale hard resin having a KSN softening point of 80°-82° C.

EXAMPLE 7

Use of the resin prepared as described in Example 1:

(a) Matt spray coatings:

15 parts of nitrocellulose Standard 24E, butanol-moist (nitrocellulose:butanol=2:1)
8 parts of resin as described in Example 1
3 parts of blown castor oil
3 parts of dioctyl phthalate
3 parts of ethyleneglycol
5 parts of butyl acetate
30 parts of ethyl acetate
5 parts of butanol
20 parts of ethyl alcohol (industrial spirit)
10 parts of toluene The solids content is 23%. The DIN 4 mm cup efflux time is 24 seconds.

Properties of the coating film:

Gloss: good
Yellowing after 15 hours' exposure to a UV lamp: slight
Water resistance on 24 hours' exposure: no spotting (b) Quick-drying primer:

42 parts of nitrocellulose Standard 27 E, as a 25% strength solution in butyl acetate
8.75 parts of groundnut alkyd resin, as a 70% strength solution in xylene
6.1 parts of resin as described in Example 1
1.65 parts of blown castor oil
1.65 parts of dibutyl phthalate
1.65 parts of zinc stearate
3 parts of ethylglycol
4 parts of isobutanol
3.2 parts of isobutyl stearate
12 parts of toluene
10 parts of xylene
6 parts of isopropanol The solids content is 27.5 % and the DIN 4 mm cup efflux time is 25 seconds.

150 g/m² of the coating composition were applied to wooden boards by means of a casting machine. After 2 hours at room temperature, the coating could be rubbed down very well with 320 grade sand paper.

Macoré veneer was coated with 100 g/m² of the above composition and the coating was left to air-dry for 1 minute, heated for 1 minute at 30° C. and 5 minutes at 60°-70° C. and again left for 1 minute; the veneer thus treated did not stick together on stacking.

(c) Paper varnish:

15 parts of nitrocellulose Standard 24 E, butanolmoist
10 parts of resin as described in Example 1
1 part of dioctyl phthalate
2 parts of dioctyl adipate
1.5 parts of poly(vinyl ethyl ether) as a 70% strength solution in ethyl alcohol
70.5 parts of solvent (ethyl acetate/industrial spirit/butyl acetate in the ratio of 2:1:1)

The solids content is 24% and the DIN 4 mm cup efflux time is 23 seconds.

When applied to art printing paper, the varnish exhibits good gloss, high resilience and very good light resistance.

(d) Anti-corrosion finish:

80 parts of vinyl chloride/vinyl isobutyl ether copolymer
15 parts of chlorinated paraffin plasticizer
33 parts of resin as described in Example 1
200 parts of xylene
60 parts of 130 M red iron oxide
128 parts of superfine talc
57 parts of superfine milled baryte (eg. EWO normal)
20 parts of anti-sedimentation paste based on silica gel.

The pigment volume concentration is 40%. The finish was sprayed onto sand-blasted iron sheet and gave good results when tested by exposure to condensation water.

We claim:

1. A process for the preparation of soft and hard resins from an urea, formaldehyde and a CH-acidic aldehyde, by reacting an urea of formula (I) or (II).

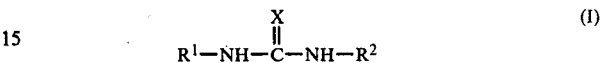

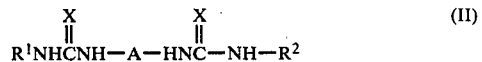

where $R^1$ and $R^2$ are hydrogen or identical or different alkyl of 1 to 18 carbon atoms, A is alkylene of 1 to 6 carbon atoms and X is oxygen or sulfur, with formaldehyde and a CH-acidic aldehyde of formula (III).

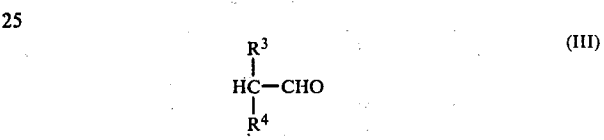

where $R^3$ and $R^4$ are identical or different alkyl, aryl or alkylaryl, the urea, formaldehyde and CH-acidic aldehyde being employed in a molar ratio of from 1:2:2 to 1:4:4, at from 60° to 150° C., in the presence of an acid, wherein the product is then after treated with an alkali metal alcoholate in an anhydrous medium.

2. A process as claimed in claim 1, wherein $R^3$ and $R^4$ in the formula III of the CH-acidic aldehyde are identical or different alkyl of 1 to 8 carbon atoms, aryl of 6 to 10 carbon atoms or alkylaryl of 7 to 10 carbon atoms.

3. A process as claimed in claim 1, wherein the reaction is carried out in the presence of an aromatic hydrocarbon.

4. A process as claimed in claim 1, wherein one or more compounds selected from the group comprising isobutyraldehyde, 2-ethylhexanal, 2-methylpentanal, 2-phenylpropanal and isovaleraldehyde are employed as the CH-acidic aldehyde.

5. A process as claimed in claim 1, wherein sodium methylate or sodium ethylate is used as the base for the after-treatment.

6. A process as claimed in claim 1, wherein the reaction is carried out in an aromatic hydrocarbon.

7. A process as claimed in claim 1, wherein the after-treatment is carried out at from 80° to 120° C.

* * * * *